(12) United States Patent
Clark

(10) Patent No.: US 6,463,888 B2
(45) Date of Patent: Oct. 15, 2002

(54) SIMPLE TOTALLY ADJUSTABLE BACK CLOSURE HARNESS

(76) Inventor: Patricia G. Clark, 232 Blue Hills Dr., Nashville, TN (US) 37214

( * ) Notice: Subject to any disclaimer, the term of this patent is extended or adjusted under 35 U.S.C. 154(b) by 0 days.

(21) Appl. No.: 09/954,762

(22) Filed: Sep. 17, 2001

(65) Prior Publication Data

US 2002/0033145 A1 Mar. 21, 2002

Related U.S. Application Data

(60) Provisional application No. 60/233,597, filed on Sep. 18, 2000.

(51) Int. Cl.[7] .............................................. A01K 27/00
(52) U.S. Cl. ....................................... 119/856; 119/792

(56) References Cited

U.S. PATENT DOCUMENTS

| | | | |
|---|---|---|---|
| 1,906,043 A | | 4/1933 | Bernstein |
| 2,187,021 A | * | 1/1940 | Everson ...................... 119/792 |
| 2,233,397 A | | 3/1941 | Bloom |
| 3,948,222 A | | 4/1976 | Longshore et al. |
| 3,994,264 A | | 11/1976 | Flynt |
| 4,676,198 A | | 6/1987 | Murray |
| 4,715,618 A | | 12/1987 | Harris |
| 4,896,630 A | | 1/1990 | Luce |
| 4,907,541 A | | 3/1990 | Thompson |
| 4,947,801 A | | 8/1990 | Glass |
| 5,035,203 A | | 7/1991 | Cardenas |
| 5,146,876 A | | 9/1992 | McPhail |
| 5,154,660 A | | 10/1992 | Snyder et al. |
| 5,167,203 A | | 12/1992 | Scott et al. |
| 5,335,627 A | * | 8/1994 | Bandimere .................. 119/856 |
| 5,370,083 A | * | 12/1994 | Sporn .......................... 119/864 |
| 5,427,061 A | * | 6/1995 | McCullough ............... 119/771 |
| 5,443,037 A | | 8/1995 | Saleme |
| 5,485,810 A | | 1/1996 | Sporn |
| 5,511,515 A | | 4/1996 | Brown |
| 5,611,298 A | | 3/1997 | Sporn |
| 5,676,093 A | | 10/1997 | Sporn |
| 5,682,840 A | * | 11/1997 | McFarland .................. 119/792 |
| 5,713,308 A | * | 2/1998 | Holt, Jr. ...................... 119/792 |
| 5,743,216 A | | 4/1998 | Holt |
| 5,794,571 A | | 8/1998 | Goldberg |
| 5,893,339 A | | 4/1999 | Liu |
| 5,915,335 A | | 6/1999 | Holt, Jr. |
| 5,920,963 A | | 7/1999 | Chou |
| 5,937,794 A | * | 8/1999 | Hediger ...................... 119/856 |
| 6,085,694 A | | 7/2000 | Simon |
| 6,101,979 A | * | 8/2000 | Wilson et al. ............... 119/725 |
| 6,164,245 A | * | 12/2000 | Johnson ...................... 119/712 |
| 6,314,915 B1 | * | 11/2001 | Pope et al. .................. 119/712 |

FOREIGN PATENT DOCUMENTS

DE    3837507 A1  * 1/1990

OTHER PUBLICATIONS

R.C. Steele Pet Supply Catalog—Summer 2000 "Easy to Use Step–In Harness" p. 55 1989 Transit Way, Box 910, Brockport, NY 14420–0910 1-800-872-4506.

* cited by examiner

Primary Examiner—Yvonne R. Abbott

(57) ABSTRACT

A harness that closes on the back by putting two rings into the clip of a leash. It consists of two straps. One end of the short strap is secured around the center bar of a tri-glide. The other end goes through a ring on the animal's chest. It then goes back through the same tri-glide and forms a loop that is secured. The long strap runs through the afore mentioned loop and one end goes through a keeper. It goes through a side ring and back through the same keeper. It goes under the side bars of a tri-glide and through the chest ring. It goes back around the center bar of the same tri-glide forming a loop that is secured. The other end of the long piece repeats the procedure on the opposite side. The other embodiment of this harness is formed using only one length of strap. The center of this strap is secured over a chest ring. One end of this strap passes through a side ring and under the side bars of a tri-glide. It goes through the chest ring and around the center bar of the tri-glide. There it is secured. The other end of the long strap passes through a second side ring. It goes under the side bars of a second tri-glide. It goes back through the chest ring and around the center bar of the second tri-glide. There it is secured.

4 Claims, 2 Drawing Sheets

SIMPLE TOTALLY ADJUSTABLE BACK CLOSURE HARNESS

CROSS-REFERENCES TO RELATED APPLICATIONS

This application claims the benefit of Provisional Patent Application Ser. No. 60/233,597, filed Sep. 18, 2000.

BACKGROUND

1. Field of Invention

This invention relates to animal harnesses that are used with a separate leash.

2. Description of Prior Art

Heretofore, animal harnesses have usually closed on an animal's underside as in U.S. Pat. No. 4,982,700 to Gordon (1991), U.S. Pat No. 5,370,083 to Sporn (1994), British Patent 521,358 to Osborne (1940), and British Patent 648,603 to Catlett (1951). Harnesses that close under an animal have some portion that must go over an animal's head. Animals dislike having anything placed over their heads. It is very difficult to close a harness on the underside of an animal. Unless the animal stands on its hind legs or lies on its back the closure can't be seen.

Harnesses that fasten without going over the animal's head have more than one closure as in U.S. Pat. No. 2,555,027 to Clayton (1948), U.S. Pat No. 5,443,037 to Saleme (1995) and U.S. Pat. No. 4,559,906 to Smith (1985). Having more than one closure is time consuming.

The Chun Pat. No. 5,893,339 (1999) goes around the animals neck with a fastener on the back of the neck. The object of most harnesses is to remove any chance of pulling on the neck as this can cause health problems.

The Step-In Adjustable Harness by Leatherite Nylorite, Carmel, Ind. 46032, utilizes a back closure with a male, female clip. It has two rings on either half of the clip with which to attach a leash. It is comprised of five pieces of strap, four rings, two size adjusters, two keepers and the closure clip. My harness eliminates the clip and uses the two rings to both close the harness and attach the leash. Furthermore, one version of my harness is comprised of two straps, three rings, three size adjusters, and two keepers. Another version uses only one strap, two size adjusters, and three rings.

Harnesses that use buckles as size adjusters joining two straps can come unfastened at the buckle site as in U.S. Pat. No 5,911,200 to Clark (1999). If the buckle comes unfastened the animal can escape.

OBJECTS AND ADVANTAGES

Accordingly, several objects and advantages of my invention are:

(a) to provide a harness that has adjustment points that can't come unfastened;

(b) to provide a harness that does not go over an animals head;

(c) to provide a harness that closes on the animals back;

(d) to provide a harness that causes little discomfort to the animal;

(e) to provide a harness that can be applied and removed speedily;

(f) to provide a harness with one point of closure;

(g) to provide a harness whose fit is readily understood.

Further objects and advantages will become apparent from a consideration of the ensuing description and drawings.

DRAWING FIGURES

REFERENCE NUMERALS IN DRAWINGS

10—short strap
11—long strap
12—loop of short strap
13—chest ring
14 and 14A—side rings for closure
15—tri-glide of short strap
16 and 16A—tri-glides on each side of long strap
17 and 17A—keepers

DESCRIPTION—FIGS. 1,2 AND

Figure 1:
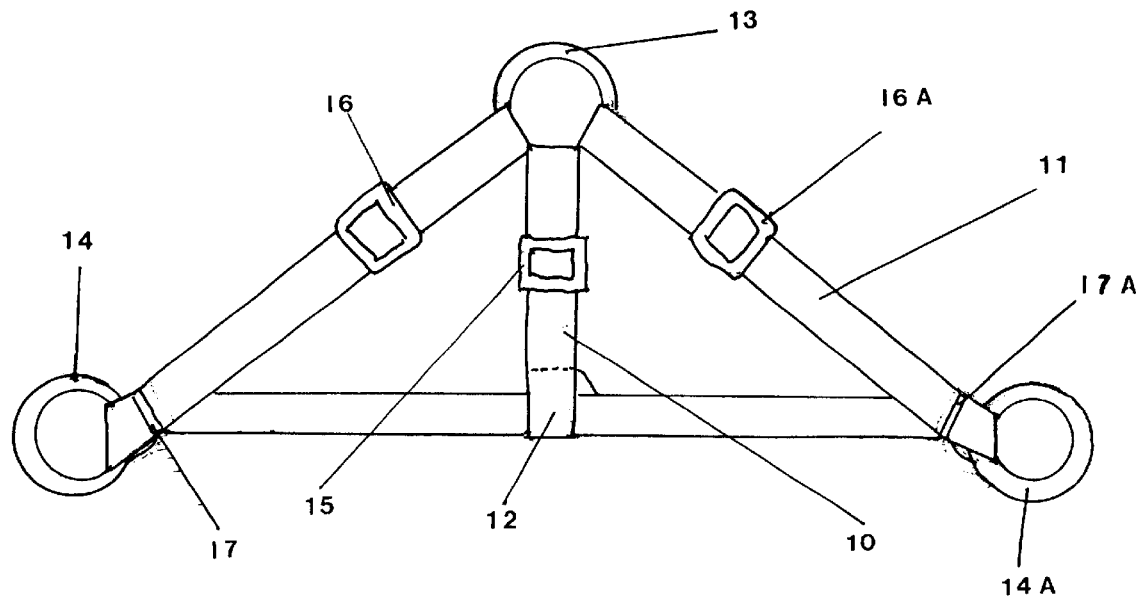
FIG. 1 is a perspective view of the harness lying flat.
Figure 2:
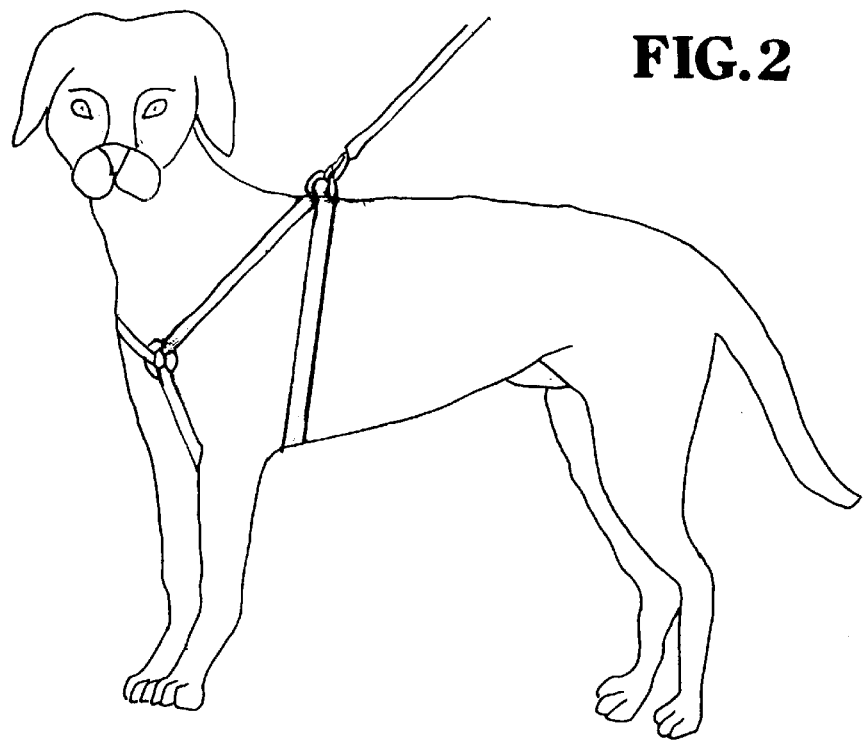
FIG. 2 is a perspective view of the harness as it would be worn by a dog
Figure 3:
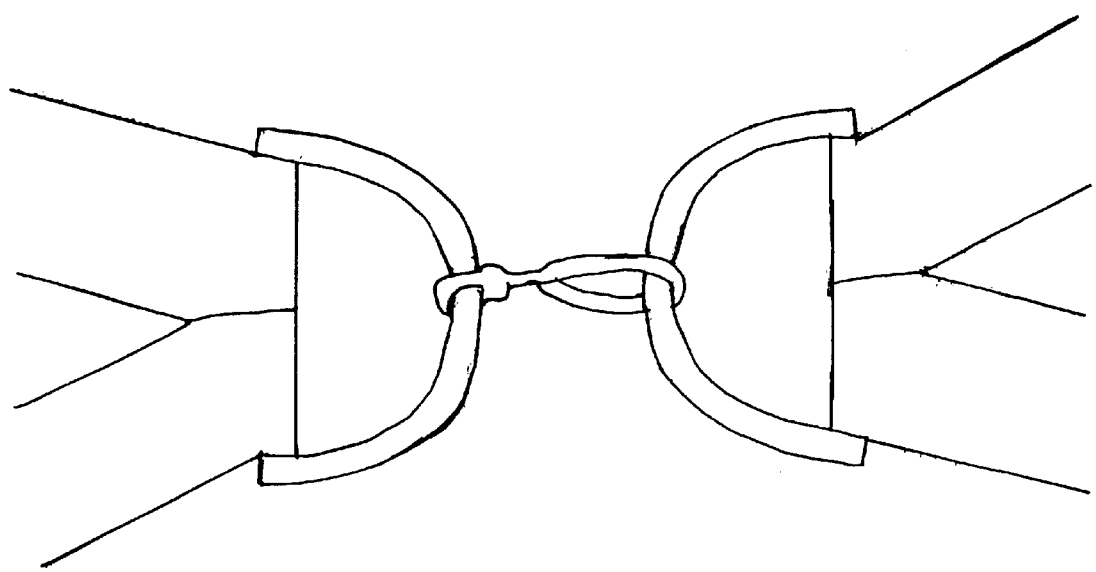
FIG. 3 is a view of one version of a closure to be used when a leash isn't being used
Figure 4:
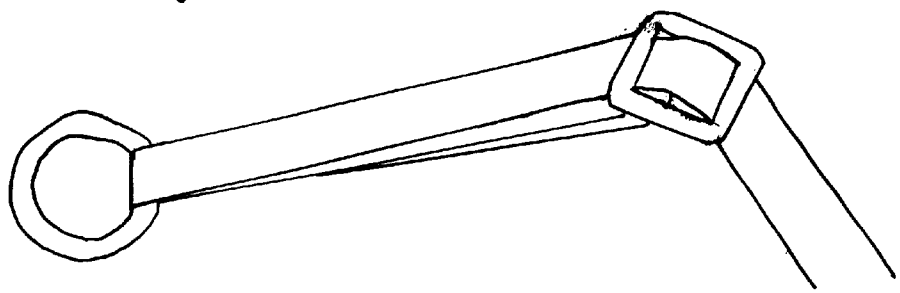
FIG. 4 is a close up view of a size adjusting means
Figure 5:
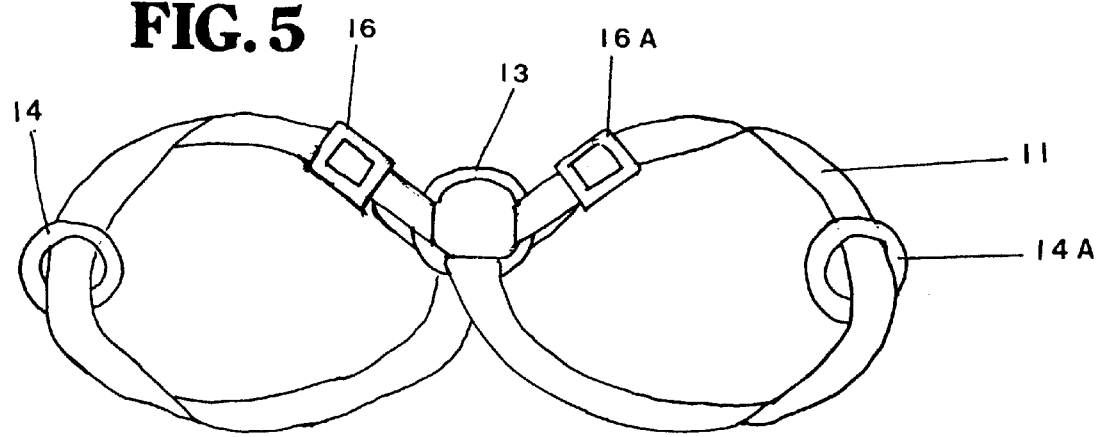
FIG. 5 is a view of the harness using only one strap

The harness is shown lying flat in FIG. 1. It is comprised of a short strap 10 that is secured over the center bar of tri-glide 15. It then goes through chest ring 13, back under side bars of tri-glide 15 and forms a loop 12. One end of long strap 11 goes through the loop 12 of short strap 10, through keeper 17, through ring 14, back through keeper 17, under side bars of tri-glide 16, through chest ring 13, over center bar of tri-glide 16 where it is secured. The other end of long strap 11 goes through keeper 17A, through ring 14A, back through keeper 17A, under side bars of tri-glide 16A, through chest ring 13, over center bar of tri-glide 16A where it is secured.

DESCRIPTION—FIG. 5

This version uses only one long strap 11. One end is secured to the center bar of tri-glide 16 and the other end passes through chest ring 13. It goes under the side bars of tri-glide 16 and through side ring 14. It goes back through chest ring 13 and through side ring 14A. It goes under the side bars of tri-glide 16A. It goes through chest ring 13 and around the center bar of tri-glide 16A. There it is secured.

OPERATION FIGS. 1,2

The manner of using the harness is to attach a leash clip to either closing means 14 or 14A. Lay the harness on a flat surface positioned as in FIG. 1. Place the animal's front feet one in each space formed on either side of short strap 10. With closing means 14 and 14A in 9 din each hand, lift both sides of the harness to the animals back. Attach the clip of the leash to the remaining closing means 14 or 14A. Thus the leash clip secures both closing means. Size the harness to the animal by sliding the tri-glides 15, 16 and 16A for a snug fit.

To remove the harness release one closing means 14 or 14A from the leash clip lower the leash and the animal can then walk out of the harness.

The purpose of short strap 10 is to keep chest ring 13 from riding up on the animal's neck; also to secure the front of the harness to the rear of the harness under the animal. Because there are no buckles to accidentally open and the only opening is on the animals back, this harness when fitted properly is almost escape proof

OPERATION FIG. 5

This version operates in the same way except that there is only one long strap 11. It passes through chest ring 13 thus eliminating short strap 10 and tri-glide 15.

CONCLUSION, RAMIFICATIONS, AND SCOPE

Thus the reader will see that this harness attaches and releases quickly. It has only one point of closure on an animal's back. It eliminates buckles and/or clips as size adjusters that might come unfastened. The short strap is permanently attached to the chest portion of the long strap. It joins the front and back of the harness beneath the animal. This harness is very secure against escape. It can also be seen that the long hair of an animal doesn't hamper this harness. Furthermore, this harness has the additional advantages in that it does not chafe the animal under its front legs;

it does not go over an animals head;

it is lightweight and can be stored compactly;

it can be made in a variety of colors and patterns.

All the ends, except for the end of the loop on the short piece that doesn't receive much strain, are enclosed within a tri-glide thus eliminating strain on the joinings.

Although the description above contains many specifications, these should not be construed as limiting the scope of the invention. They merely provide illustrations of some of the presently preferred embodiments of this invention. For example, the closing means could be of varying materials, shapes, sizes, and colors. The size adjusting means could be of varying materials, shapes, sizes, and colors. The straps could be of varying widths, lengths, colors, and materials.

Thus the scope of the invention should be determined by the appended claims and their legal equivalents, rather than by the examples given.

I claim:

1. A harness for animals comprising
   (a) closing element at a leash attachment point
   (b) a short strap one end attaching to a size adjusting means the other end going through a chest element back through the said size adjusting means and forming a loop
   (c) a long strap one end attached to a second size adjusting means the other end going through said chest element back through said second size adjusting means through a keeper through a first closing element back through said keeper through said loop of said short strap through a second keeper through a second closing element back through said second keeper through a third size adjusting means through said chest element back through and attaching to said third size adjusting means.

2. The harness of claim 1, further including an element for joining said closing elements other than a leash clip.

3. A harness for animals comprising
   (a) a chest element
   (b) two keepers
   (c) three size adjusting means
   (d) a long strap one end going through loop of short strap through a first keeper through first closing element back through said first keeper through said size adjusting means through said chest element back through and attaching to said size adjusting means the other end through a second keeper through second closing element back through said second keeper through said second size adjusting means through said chest element back through and attaching to said second size adjusting means
   (e) a short strap one end attaching to a third size adjusting means the other end going through said chest element back through said third size adjusting means forming a loop that is secured
   (f) said two closing elements at a leash attachment point whereby said harness is closed on an animal's back with one closure point and formed with only two pieces of webbing, two closing elements, three size adjusting means, a chest element and two keepers.

4. A harness for animals comprising
   (a) a chest element
   (b) a long strap one end secured to a size adjusting means the other end of said long strap passing through said chest element back through said size adjusting means through
   (c) a closing element through said chest element through
   (d) a second closing element through
   (e) a second size adjusting means through said chest element through said second size adjusting means where it is secured whereby said harness is closed on animal's back with only one closure point and using only one length of webbing, two size adjusting means, two closing elements and one chest element.

* * * * *